United States Patent
Fabiyi et al.

(10) Patent No.: US 7,513,999 B2
(45) Date of Patent: Apr. 7, 2009

(54) OZONATION OF WASTEWATER FOR REDUCTION OF SLUDGE OR FOAM AND BULKING CONTROL

(75) Inventors: Malcolm Ezekiel Fabiyi, Lagrange Park, IL (US); Richard Novak, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 50 days.

(21) Appl. No.: 11/880,694

(22) Filed: Jul. 24, 2007

(65) Prior Publication Data
US 2008/0105614 A1 May 8, 2008

Related U.S. Application Data

(63) Continuation-in-part of application No. 11/591,894, filed on Nov. 2, 2006.

(51) Int. Cl.
*C02F 3/00* (2006.01)
(52) U.S. Cl. .................. 210/625; 210/627; 210/760
(58) Field of Classification Search .......... 210/625, 210/627, 760
See application file for complete search history.

(56) References Cited

U.S. PATENT DOCUMENTS

| | | | |
|---|---|---|---|
| 4,178,239 A | 12/1979 | Lowther | |
| 4,370,235 A | 1/1983 | Suzuki et al. | |
| 6,086,766 A * | 7/2000 | Yasui | 210/625 |
| 6,126,842 A | 10/2000 | Decker | |
| 6,146,521 A | 11/2000 | Yasui | |
| 6,592,767 B1 | 7/2003 | Yasui | |
| 6,773,597 B2 | 8/2004 | Zhang | |
| 6,942,801 B2 | 9/2005 | Nishimura | |
| 2005/0133445 A1 | 6/2005 | Campo | |
| 2006/0086661 A1 | 4/2006 | Campo et al. | |

FOREIGN PATENT DOCUMENTS

| | | |
|---|---|---|
| EP | 0835845 B1 | 4/1998 |
| EP | 0645347 B1 | 3/2000 |
| EP | 1361198 A1 | 11/2003 |
| FR | 2845682 A1 | 4/2004 |
| JP | 8132100 A | 5/1996 |
| JP | 9150182 A | 6/1997 |
| WO | WO 02/08803 A2 | 1/2002 |

OTHER PUBLICATIONS

"Sludge Disintegration: Reducing bio sludge by means of ozone by 40 to 80%" Translation of Air Liquide's press release of May 2006 (2 pages).

* cited by examiner

*Primary Examiner*—Chester T Barry
(74) *Attorney, Agent, or Firm*—Robert J. Hampsch

(57) ABSTRACT

A system and method for the ozone treatment of wastewater is disclosed. The disclosed wastewater treatment system includes a high selectivity reactor coupled to an activated sludge treatment basin. The high selectivity reactor is adapted to receive a stream containing sludge diverted directly or indirectly from the activated sludge treatment basin. The disclosed wastewater treatment system and method is adapted to inject a chemical agent, such as ozone-enriched gas, into the diverted stream for treatment within the high selectivity reactor for purposes of sludge reduction, foam control, or bulking control. The treated stream is then returned to the activated sludge treatment basin.

3 Claims, 5 Drawing Sheets

OZONATION OF WASTEWATER FOR REDUCTION OF SLUDGE OR FOAM AND BULKING CONTROL

CROSS REFERENCE TO RELATED APPLICATIONS

This application is a continuation-in part application to U.S. patent application Ser. No. 11/591,894 filed Nov. 2, 2006.

FIELD OF THE INVENTION

The present invention relates to methods and systems for wastewater treatment and more particularly, to the treatment of sludge with ozone in a high selectivity reactor for purposes of sludge reduction and foam control.

BACKGROUND

Traditional methods of wastewater treatment involve bringing wastewater streams into contact with bacteria either in an aerobic or anaerobic type process in what is known as activated sludge treatment. These bacteria consume parts of the substrate material or waste contained in the wastewater, which are typically organic compounds containing carbon, nitrogen, phosphorus, sulfur, and the like. Typically, a portion of the waste is consumed to further the metabolism of the bacterial cells or maintain the physiological functioning of the bacterial cells. In addition, a portion of the waste is also consumed as part of the process of synthesis of new bacterial cells. The activated sludge treatment process yields a certain amount of sludge and associated solids which must be continuously removed from the treatment basin to maintain the steady state sludge balance which is critical to the effective functioning of the activated sludge treatment system.

In order to maintain waste removal capacity of the treatment plant at steady state it is important to control the generation of new bacterial cells within the activated sludge treatment process. Too much synthesis of new bacterial cells in excess of what is required for the treatment of the waste at or near steady state results in excess biosolids formation attributable to the accumulation of such newly synthesized but unneeded bacterial cells. This excess biosolids must be continuously removed during the activated sludge treatment process.

Existing methods for dealing with the removal of sludge includes transporting the sludge to landfills, utilization of sludge for land application or agricultural purposes, and incineration of the sludge. Most sludge disposal operations require some prior treatment of the sludge; a process known in the art as solids handling. Solids handling processes are often costly and time consuming operations and typically involve one or more of the following steps: (a) the concentration of the sludge in a thickener, usually requiring the use of polymers; (b) digestion of the sludge in order to stabilize the bacteria and to further reduce the volume and pathogen content of the sludge; (c) dewatering of the sludge to reach approx 15-25% solids content; which involves the passage of the sludge through centrifuges or other solid-liquid separation type devices; (d) storage of the sludge; and (e) transportation to sites for landfill, land application by farmers, or other end use.

It is estimated that the costs associated with solids handling and disposal processes can be between 20-60% of total operating costs associated with the overall wastewater treatment process. Due to the cost and time associated with solids handling and disposal, it is beneficial to minimize the amount of excess sludge produced in the wastewater treatment process.

In conventional activated sludge treatment systems and methods, oxygen is required both for the chemical oxidation of the substrate material (i.e. waste) as well as for the synthesis of new cells and metabolic processes of the bacterial cells. Use of ozone in addition to oxygen for the treatment of sludge has also been reported. More particularly, ozone treatment of sludge has been reported in combination with mechanical agitators and/or a pump providing the motive mixing. The sludge-ozone contact typically occurs in a continuously stirred tank reaction (CSTR) mode, and lysis (breaching of the integrity of the cell wall) results as a consequence of the strong oxidizing action of ozone on the cell walls. Lysis leads to the release of the substrate rich cellular content of the bacterial cells. In this way, the solid cells which would otherwise have been discharged as excess sludge are lysed, and by so doing, they are transformed to substrate which can then be consumed by bacteria in the treatment basin.

The cellular content is a liquid matrix which is comprised of proteins, lipids, polysaccharides and other sugars, DNA, RNA and organic ions. Because of the low selectivity that occurs when sludge ozone contacting is carried out in a continuously stirred reactor mode, excessive amounts of ozone are consumed using prior methods for sludge ozonation. In addition, some prior reported uses of ozone required specialized pre-treatment or modification of the sludge. Such pre-treatments and modifications may include adjusting the pH of the sludge, increasing the temperature of the sludge, increasing the pressure of the ozone treatment vessel, or passing the sludge through anaerobic pre-digestion steps. Thus, the prior use of ozone in the treatment of sludge involved additional complexity, materials, equipment and the increased costs associated therewith.

Three major methods for reactor systems are known, these being the Continuously Stirred Tank Reactor system (CSTR), the higher selective Plug Flow Reactor (PFR) and the Batch Reactor System (BRS). The major difference between the different reactor modes lies fundamentally in: (i) the average amount of time that a molecule stays within the reaction space, also known as the residence time; (ii) the interaction between reacting 'parcels' e.g., there is significant back-mixing in the CSTR, while the PFR is characterized by very limited, if any, back-mixing; and (iii) the yield obtained.

In addition to the challenges associated with sludge reduction, one of the other formidable challenges in many wastewater treatment operations is the control of foaming and bulking in the wastewater. Foaming and bulking problems are generally caused by the presence of an abundance of filamentous bacteria such as Nocardia and Parvicella bacteria in the wastewater. Such filamentous organisms tend to prosper in wastewater where there is either a low level of dissolved oxygen in the wastewater or a deficiency of nutrients in the wastewater as characterized by a low food to microorganism ratio.

Foaming problems are often characterized by the presence of a light tan foam covering up to 25% of the activated sludge basin surface and often contribute to operational problems within the wastewater plant including undesirable odors, solids washout and generally hazardous working conditions, Bulking, on the other hand, is characterized by the presence of filamentous organisms that extend from the floc thereby causing an interference with settlement and compaction properties of sludge. This adversely impacts clarifier performance and often results in poor effluent quality.

The control of bulking and foaming problems in wastewater treatment operations requires the elimination or control of filamentous organisms in wastewater. Conventionally, the control of filamentous organisms in wastewater is effected through the addition of oxidizing agents like chlorine, peroxide and ozone to the activated sludge basin. Alternate means of controlling of filamentous organisms include increasing the nutrient loading or improving the oxic state of the sludge or both.

SUMMARY OF THE INVENTION

The invention may be broadly characterized as a method of treating wastewater with ozone or other oxidizing agent for the removal of sludge or the control of foaming and bulking. The disclosed method includes the steps of: (a) receiving an influent of wastewater into a wastewater treatment reactor; (b) oxidizing biosolids within the wastewater treatment reactor; (cx) discharging a stream from the wastewater treatment reactor; (d) diverting a portion of the stream discharged from the wastewater treatment reactor to a high selectivity treatment reactor; (e) introducing an oxidizing agent to the high selectivity treatment reactor for further treatment of the diverted stream; and (e) returning the further treated stream to the wastewater treatment reactor. The treatment of the stream in the high selectivity reactor may include, for example, treatment of the stream with ozone for sludge reduction, treatment of the stream with ozone for foaming control, or treatment of the liquid stream for control.

The present invention may also be characterized as a method of reducing foaming or bulking of wastewater in an activated sludge basin. The preferred method of reducing foaming or bulking of wastewater comprises the steps of: (a) oxidizing biosolids within the activated sludge basin; (b) discharging an activated sludge stream from the activated sludge basin; (c) diverting a portion of the activated sludge stream discharged from the activated sludge basin to an ozone treatment reactor; (d) introducing ozone to the diverted stream in the ozone treatment reactor to induce lysis of filamentous bacteria; and (e) returning the ozonated liquid stream to the activated sludge basin.

BRIEF DESCRIPTION OF THE DRAWINGS

The above and other aspects, features, and advantages of the present invention will be more apparent from the following, more detailed description thereof, presented in conjunction with the following drawings, wherein.

Corresponding reference numbers indicate corresponding components throughout the several views of the drawings.

DETAILED DESCRIPTION

In conventional activated sludge treatment systems and methods, oxygen is required both for the chemical oxidation of the substrate material as well as for new cell synthesis and metabolic processes of the bacterial cells. The oxygen requirement for the chemical oxidation of the substrate material in the treatment process is often referred to as the Chemical Oxygen Demand (COD) whereas the oxygen requirement for the removal of the substrate via the consumption of substrate for new cell synthesis and the maintenance of metabolic processes of the bacterial cells is referred to as the Biological Oxygen Demand (BOD).

Figure 1:
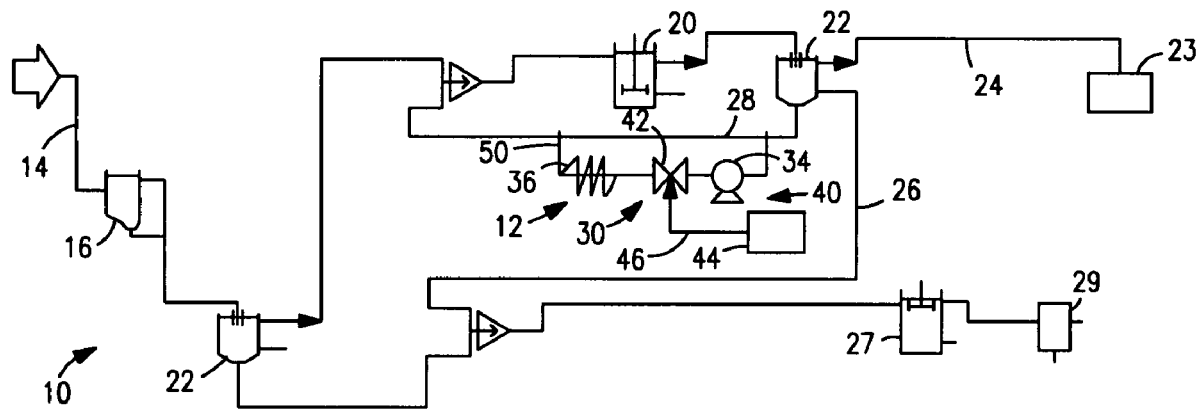
FIG. 1 is a schematic representation of an activated wastewater treatment system incorporating an embodiment of the present system and process.

FIG. 1, shows a schematic illustration of an activated sludge treatment system (10) incorporating an embodiment of the present sludge ozonation system (12). As seen therein, the typical activated sludge treatment system (10) includes an intake conduit (14) adapted to receive an influent of wastewater, various pre-processing devices (16) and a wastewater treatment reactor (20), which can be an aeration basin, membrane bioreactor, or other system intended for the purpose of using microbial life to effect the removal of waste from water. The illustrated system also includes one or more clarifiers or filtration modules (22) adapted to separate the cleansed liquid from the accumulated sludge, an output conduit (24) for transporting the effluent or cleansed liquid to a discharge (23), a waste activated sludge line (26) and a return activated sludge (RAS) line (28) adapted to transport and return the treated stream back to the activated sludge basin (20) or other high selectivity reactor. Also shown are a digester (25) and dewatering device (27).

In the illustrated embodiment, some of the biosolids or sludge are included as part of the waste activated sludge (WAS) and a portion of the biosolids or sludge are transported along the RAS line (28) from the clarifiers (22) to the activated sludge basin (20). Along the way, a prescribed amount of the liquid including the sludge and biosolids is diverted to the sludge ozonation reactor (30) for ozonation. However, the diverted stream need not be treated or modified prior to entering the reactor (30). The present wastewater treatment system (12) and process involves use of a high selectivity treatment reactor (30) designed to effectively treat the diverted stream. The high selectivity treatment reactor is preferably a plug flow reactor (30) which receives a diverted stream (32) that either runs parallel to the RAS line (28) or is a sidestream from the RAS line (28).

Sludge Reduction

For sludge reduction purposes, the total volume flow rate through the plug flow reactor (30) preferably ranges from about 1 times the equivalent volumetric flow rate of the waste activated sludge (WAS) to about 40 times the equivalent volumetric flow rate of the waste activated sludge (WAS). This range of between about 1 to 40 times the equivalent volumetric flow of the waste activated sludge (WAS) establishes in part, the optimum gas to liquid ratio within the plug flow reactor (30). Preferably, the gas to liquid ratio should be less than or equal to 1.0. Total sludge volumetric flow rate is adjustable and is preferably controlled in conjunction with ozone-enriched gas flow and ozone concentration in the ozone enriched gas flow in the plug flow reactor, to achieve the desired level of reduction in sludge or biosolids while minimizing required ozone dosage.

As seen in FIG. 1, the diverted sludge stream (32) is passed through a pump (34) to a sludge ozonation reactor shown as the plug flow reactor (30). The plug flow reactor (30) includes a sufficient length of pipe (36) that together with the flow rate assures a residence time of the sludge in the plug flow reactor (30) that is adequate for ensuring effective dissolution of the ozone and reaction of the ozone with the biosolids. The illustrated embodiments also include one or more gas injection systems (40) through which an ozone-enriched gas is introduced to the plug flow reactor (30). The preferred gas injector systems (40) comprises a source of ozone-enriched gas and one or more nozzles or venturi type devices (42) for injecting the ozone-enriched gas into the sludge. Preferably, the source of ozone-enriched gas is an ozone generator (44) coupled to a source or supply of oxygen gas (not shown). Alternatively, the ozone-enriched gas stream (46) can be supplied from specialized on-site ozone storage systems. Preferably, the desired concentration of ozone is greater than or equal to 6%. Higher concentrations of ozone are preferable as such higher concentrations help ensure that the gas to liquid ratio in the sludge contactor is maintained within an optimal range.

The ozone-enriched gas is preferably supplied to the illustrated embodiment at nominal pressures and typically pressures lower than the operating pressures within the portion of the plug flow reactor (30) proximate injecting devices (42). In this manner, the ozone-enriched gas is ingested into and through the injecting devices (42) by a vacuum draw generated by the pressure drop across the injecting devices (42). However, one skilled in the art can appreciate embodiments where the ozone-enriched gas is supplied at pressures higher than the pressure within the plug flow reactor (30) or other gas-liquid contacting enclosure.

The gas injector system (40) also includes a suitable controlling means or mechanism (not shown) that allows operative control of the injection rate, timing, and volume of ozone-enriched gas. Control of the gas injection rate, injection timing, and volume of ozone-enriched gas is targeted to provide efficient gas-liquid contacting and to promote optimal dissolution of ozone into the liquid stream flowing through the plug flow reactor (30). More particularly, control of the gas injecting system is preferably adjusted to be within a prescribed range of gas flow to liquid flow ratio, wherein the gas flow is ascertained from the injection rate, timing and volume of gas through the injecting devices (42) and the liquid flow represents the flow of sludge through the plug flow reactor (30). The preferred range of gas to liquid ratios is less than or equal to about 1.0. This gas to liquid ratio ensures that the gas or ozone is suitably dispersed in the liquid and further ensures that there is not an excess of gas in the fluid mix. Excessive back-mixing and churn is minimized. More importantly, the above-described gas to liquid ratio together with other related flow characteristics operate to minimize excessive back-mixing and churn as well as avoid stratification of the respective flows.

Having passed through the plug flow reactor (30), the ozonated sludge is returned to the plant RAS line (28) via a return line (50). Alternatively, the ozonated sludge or liquid stream exiting the plug flow reactor (30) may be returned to the activated sludge basin (20) in a separate line from the rest of the RAS flow, or may be returned to a different portion of the wastewater treatment plant. Generally, if the main RAS flow is going to an anoxic or anaerobic basin, then it may be preferable for the ozonated sludge (which is now highly oxygenated also) to go to an oxic or aerobic basin. Otherwise the oxygen content of the ozonated sludge could disrupt the conditions required in the anoxic or anaerobic stages.

At the end of the RAS line (28) or return line (50) is an optional ejector mechanism, eductor, or exit nozzle arrangement (not shown) adapted to return the ozonated sludge at the surface or at a sufficient depth in the activated sludge basin (20) and to ensure good mixing of the ozonated sludge with the bulk liquid in the activated sludge basin (20). The ejector mechanism or exit nozzle arrangement (not shown) also serves to promote recovery of oxygen in the above-identified process.

The operating principles behind the disclosed sludge ozonation treatment system involve the contacting of the biosolids and dissolved ozone in a plug flow reactor, in which the primary contact and reaction of the oxidant (dissolved ozone) and the biosolids occurs. The present process requires the effective gas-liquid contacting between the liquid stream of sludge or mixed liquor and an ozone-enriched gas to promote efficient dissolution of ozone in the liquid stream. Effective gas-liquid contacting is achieved with properly designed plug flow reactors and ozone-enriched gas injection techniques.

In the reaction between the ozone-enriched gas and the biosolids in the plug flow reactor, the cell walls of the bacterial cells are breached or weakened as a result of the ozone induced chemical oxidation of the cellular walls of the bacteria. This breaching of the bacteria cell walls is known as lysis and it leads to the release of the cellular content of the bacterial cells. The cellular content is generally a liquid matrix which is comprised of proteins, lipids, polysaccharides and other sugars, DNA, RNA and organic ions. As a result of the lysis, the solid cells of the biosolids, which would otherwise have been accumulated and discharged in the solids handling process, are transformed to substrate (COD) components and subsequently consumed by the bacteria in the activated sludge treatment basin.

A plug-flow reactor is used to achieve a high selectivity of the lysis reaction by providing for a narrow range of contact time between excess bacteria cells or biosolids and dissolved ozone, so that ozone is used only for or predominately for oxidation process leading to bacteria cell lysis ("primary reaction"). Ideally, the ozone dosage and liquid-gas contact time is limited so as not to further oxidize the cell contents ("secondary reactions"). This provides for the most efficient use of ozone, leading to the maximum sludge reduction at the minimum ozone dosage. Preferred contact time ranges between about 10 to 60 seconds.

The ozone dosage ingested into the sludge is also controllable either by adjustments in ozone concentration in the gas flow or adjustments in flow rate of ozone-enriched gas injected into the sludge or both. Ozone dosage control is targeted to achieve the desired cell lysis activity at minimum ozone usage.

Figure 2:
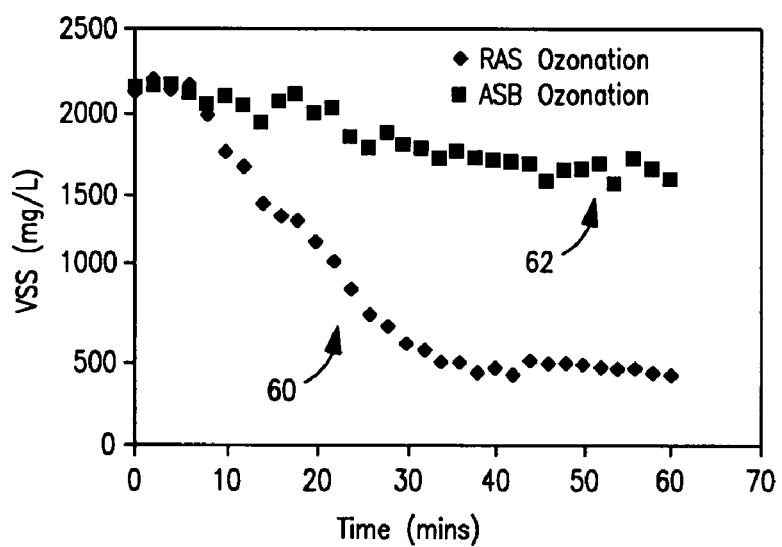
FIG. 2 is a graph that depicts the operating performance of an excess sludge treatment process in accordance with the presently disclosed embodiments.

Turning now to FIG. 2, there is illustrated a graph depicting the operating performance of an activated sludge treatment process with ozonation of sludge in the plug flow reactor in accordance with the disclosed embodiments as compared to a sludge reduction process as taught in the prior art comprising an activated sludge treatment process with ozonation applied in a continuous stirred reaction mode to a portion of the RAS, which is then returned directly to the activated sludge basin. The same ozone flow rate is applied in both examples. As seen therein, the steeper profile of the curve (60) associated with the present ozonation process indicates a faster rate at which the lysis process occurs and an overall enhanced reduction or elimination of solids per unit of ozone applied. Approximately 1600 mg/L of solids are removed within the initial 40 minutes using the current ozonation process as depicted by curve (60) compared to about 400 mg/L of solids removed using conventional ozonation process as depicted by curve (62), with the same total dosage of ozone applied in both cases.

Table 1 shows another comparison of biosolids production in a wastewater treatment facility using the above described ozonation process with biosolids production in the same wastewater treatment facility without use of the present sludge ozonation reactor and associated process.

Also, Table 2 shows a comparison of the sludge reduction performance of presently disclosed sludge ozonation system and process to various other reported sludge ozonation examples. As seen therein, the Removal Factor (i.e. kg Total Sludge removed per kg of Ozone used) of the presently disclosed sludge ozonation system far exceeds the apparent Removal Factor of systems disclosed in prior art literature.

TABLE 1

Biosolids Reduction

|  | w/o Ozonation System | w/Ozonation System |
|---|---|---|
| COD Removed (per day) | 10,000 kg | 10,000 kg |
| Ozone Consumed (per day) | 0 kg | 70 kg |
| BioSolids (SS) Production Rate | .35 kg SS/kg COD | .21 kg SS/kg COD |
| BioSolids (SS) Produced | 3500 kg | 2100 kg |
| Ozone Dosage (kg Ozone/kg SS Reduced) | 0 | .05 |
| % BioSolids Reduced | 0% | 40% |
| Ratio - kg BioSolids Reduced/kg Ozone | 0 | 20 |

TABLE 2

Sludge Reduction System Comparisons

| Reference | Ozone Dosage (kg Ozone/kg Sludge Treated) | Ozone Consumption (kg Ozone per kg Sludge Reduced) | Removal Factor (kg Sludge Reduced per kg Ozone) |
|---|---|---|---|
| Yasui et al (1996) Wat. Sci. Tech (3-4) pp 395-404 | 0.05 | 0.165 | 6.06 |
| Sakai et al (1997) Wat. Sci. Tech 36-(11) pp 163-170 | NR | 0.133 | 7.52 |
| Sakai et al (1997) Wat. Sci. Tech 36-(11) pp 163-170 | NR | 0.148 | 6.76 |
| Sakai et al (1997) Wat. Sci. Tech 36-(11) pp 163-170 | 0.034 | 0.178 | 5.62 |
| Kobayashi et al (2001) Proceedings of the 15th Ozone World Conference, London | NR | 0.250 | 4.00 |
| Sievers et al (2003) Proc. of the 3$^{rd}$ Conf for Water and Wastewater Treatment, Goslar | 0.05 | 0.395 | 2.53 |
| Present Sludge Ozonation System | 0.003-0.01 | 0.050 | 20.00 |

Figure 3:
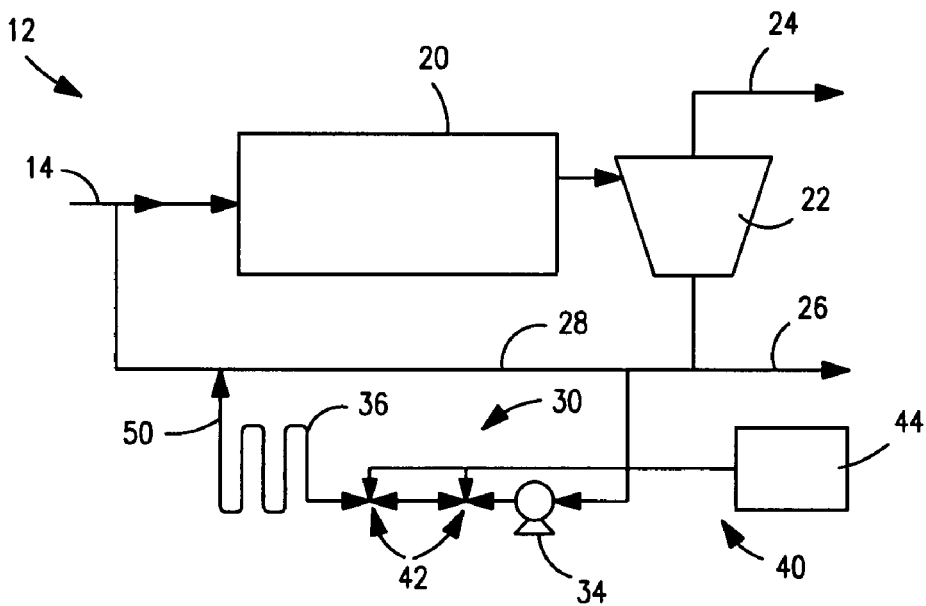
FIG. 3 is a schematic representation of an alternate embodiment of the present system and process wherein ozone-enriched gas is introduced at multiple locations within the high selectivity reactor.

FIGS. 3-9 illustrate alternate embodiments of the present sludge treatment process. In particular, FIG. 3 illustrates an embodiment of the sludge treatment process wherein ozone-enriched gas is injected or otherwise introduced at multiple locations at or proximate to the plug flow reactor (30). Multiple point injection can be beneficial to more precisely control or realize improved gas-liquid contacting that needs to occur in the plug flow reactor (30).

Figure 4:
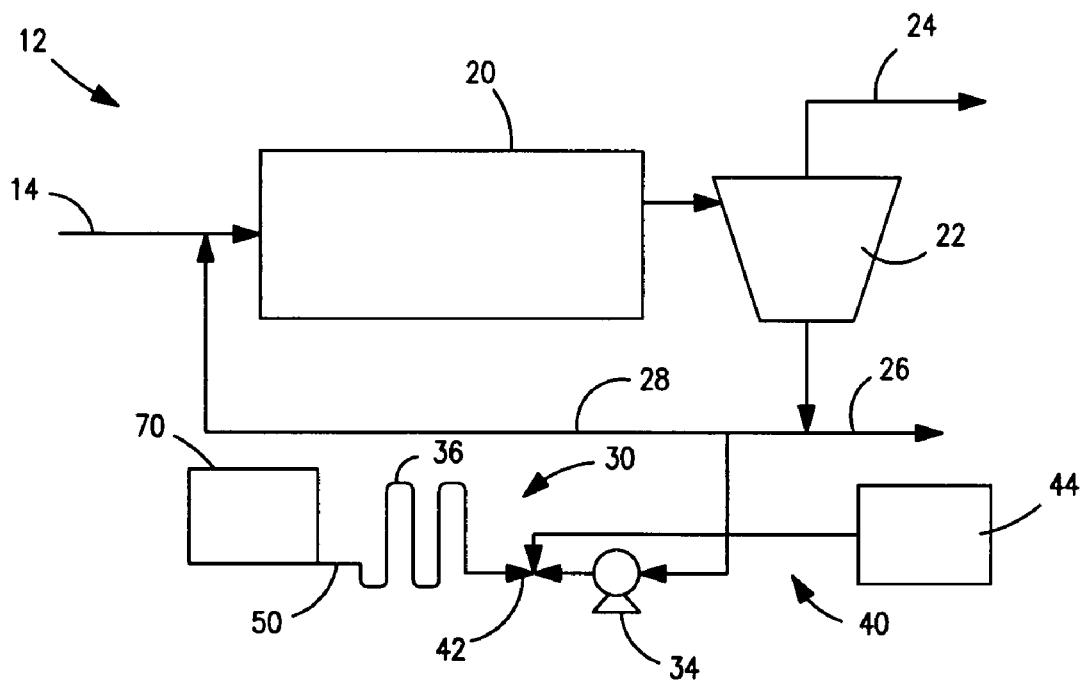
FIG. 4 is a schematic representation of another alternate embodiment of the present system wherein the discharge line from the reactor is coupled to some other sludge post-treatment process downstream of the reactor.

FIG. 4 also illustrates another embodiment of the present wastewater treatment system and process wherein the return conduit (50) from the high selectivity reactor (30) is not returned directly to the continuously stirred tank reactor or activated sludge basin (20), but rather to some other post-treatment process downstream of the plug flow reactor (30) such as a digester, sludge stabilization unit, or secondary treatment basin (70). In such embodiment, it is conceivable to inject chemical agents other than ozone, such as chlorine, biocides, polymers, odor control agents, or even other gas mixtures suitable to carry out the desired treatment process in the high selectivity treatment reactor.

Figure 5:
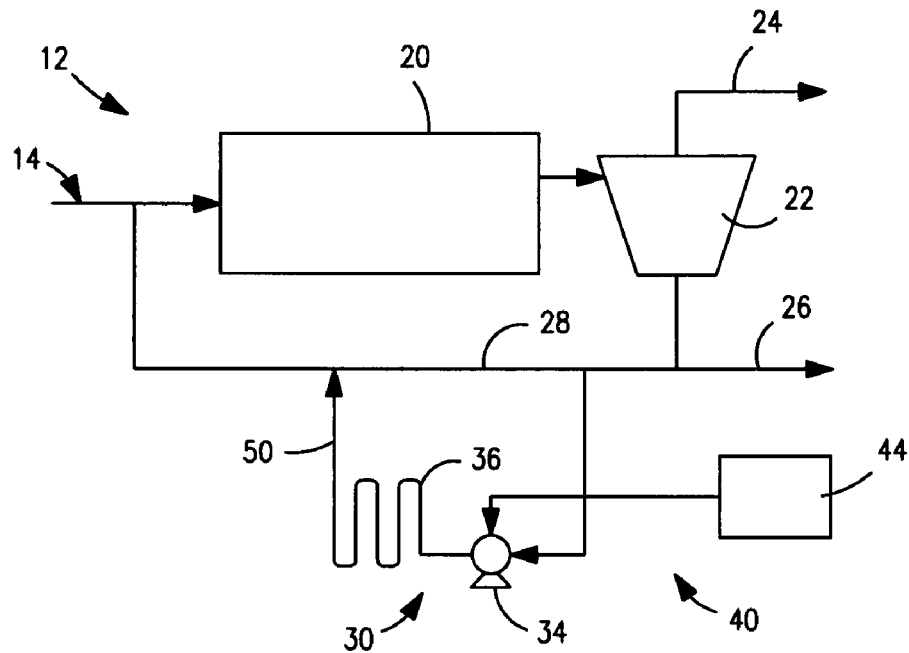
FIG. 5 is a schematic representation of still another alternate embodiment of the present system wherein the ozone-enriched gas injection system injects the ozone-enriched gas at or near the pump associated with the reactor.

FIG. 5 illustrates an embodiment of the present sludge treatment system and process wherein the plug flow reactor (30) includes a pump (34) and ozone-enriched gas injection system (40) adapted to inject the ozone-enriched gas at or near the pump (34).

Figure 6:
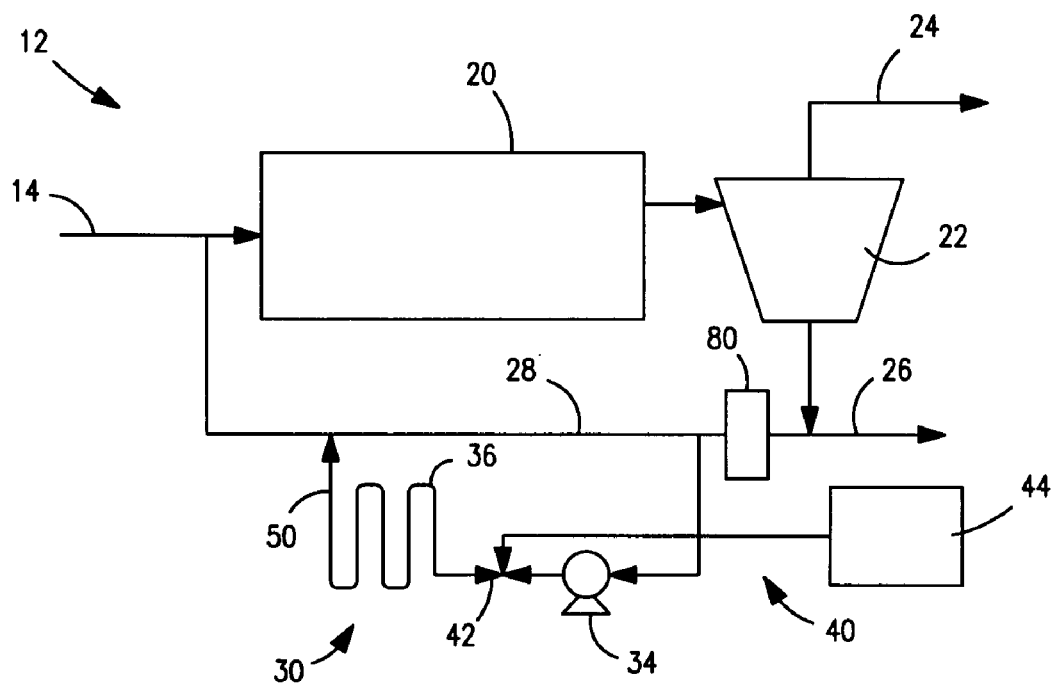
FIG. 6 is yet another embodiment of the present system and process where sludge is pre-processed prior to the high selectivity reactor.

FIG. 6 illustrates yet another embodiment of the sludge ozonation system (12) where the sludge for treatment in the plug flow reactor (30) is pre-processed via a sludge thickener or other device for concentration of solids (80). Alternatively, the sludge to be diverted to the plug flow reactor (30) may be diluted with water (not shown) to yield a liquid stream with lower solids concentration entering the plug flow reactor (30).

Still another pre-processing or pre-treatment technique that may be employed with the disclosed embodiments of the invention involves passing the sludge through a digester or other means for sludge stabilization or solids handling prior to diversion to the plug flow reactor. Still other sludge pre-treatment techniques compatible with the present sludge ozonation system and process would include the addition of solubilizing agents to the sludge, application of ultrasonic waves, homogenization, and other mixing or agitation means. Also, the use of chemical agents that facilitate the lysis of the bacteria cells or enhance the capacity for digestion of the sludge could be used.

Figure 7:
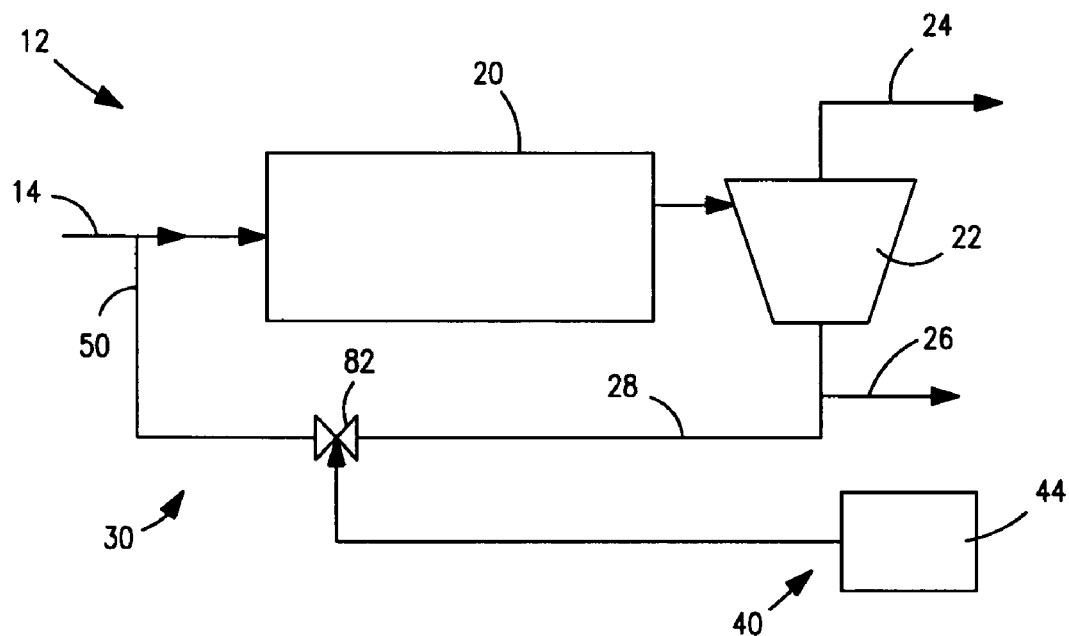
FIG. 7 is yet another alternate embodiment of the present system wherein the gas-liquid contacting between the ozone-enriched gas and liquid stream occurs upstream of the reactor.

FIG. 7 illustrates an embodiment of the present sludge ozonation system (12) and method where the initial gas-liquid contacting between the ozone-enriched gas and liquid stream occurs upstream of the plug flow reactor (30) and/or in the RAS line (28). In the illustrated embodiment a gas-sludge contactor device (82) such as spargers, diffusers, venturi devices or high velocity mixing nozzles is disposed upstream of the plug flow reactor (30). The gas-sludge contactor device (82) discharges the mix to the plug flow reactor (30) where the bacterial cell lysis and other reactions occur.

In those embodiments of the present sludge ozonation system and process where the initial gas-liquid contacting occurs in the RAS line (28) or upstream of the plug flow reactor (30), the ozone-enriched gas may be supplied to the headspace above the liquid stream or may be supplied under pressure to a prescribed mixing region at a prescribed orientation relative to the liquid stream (e.g. the impeller region of a mechanically agitated gas-sludge contactor device or injecting devices such as nozzles, spargers, and diffusers which are oriented at a prescribed angle and distance vis-à-vis the liquid surface.)

Figure 8:
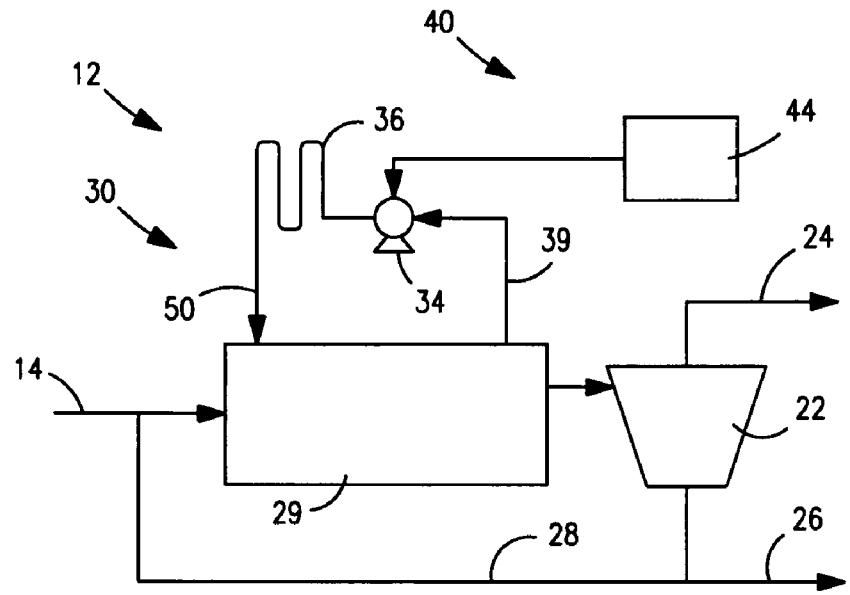
FIG. 8 is yet another embodiment of the present system wherein the treated liquid stream is a mixed liquor stream from the activated sludge basin.

FIG. 8 depicts another alternate embodiment where the treated liquid stream is not clarifier underflow or otherwise diverted from the RAS but rather is a 'mixed liquor' fluid drawn via conduit 39 from the aerated basin 29. Again, in this embodiment, it is conceivable to inject chemical agents other than ozone, such as chlorine, pH adjusting-agents, biocides, odor control agents, or even other gas mixtures such as carbon dioxide, nitrogen, oxygen, ozone, and mixtures thereof, suitable to carry out the desired treatment process to the sludge stream in the high selectivity treatment reactor.

For activated sludge treatment systems employing a membrane bioreactor configuration, the alternate arrangement would likely be similar to that illustrated in FIG. 8 but would not involve the use of a clarifier and instead would use a polymeric or ceramic membrane unit (not shown) within the aeration basin. The diverted liquid stream would be a mixed liquor that is directed to the plug flow reactor or other high selectivity treatment reactor.

Figure 9:
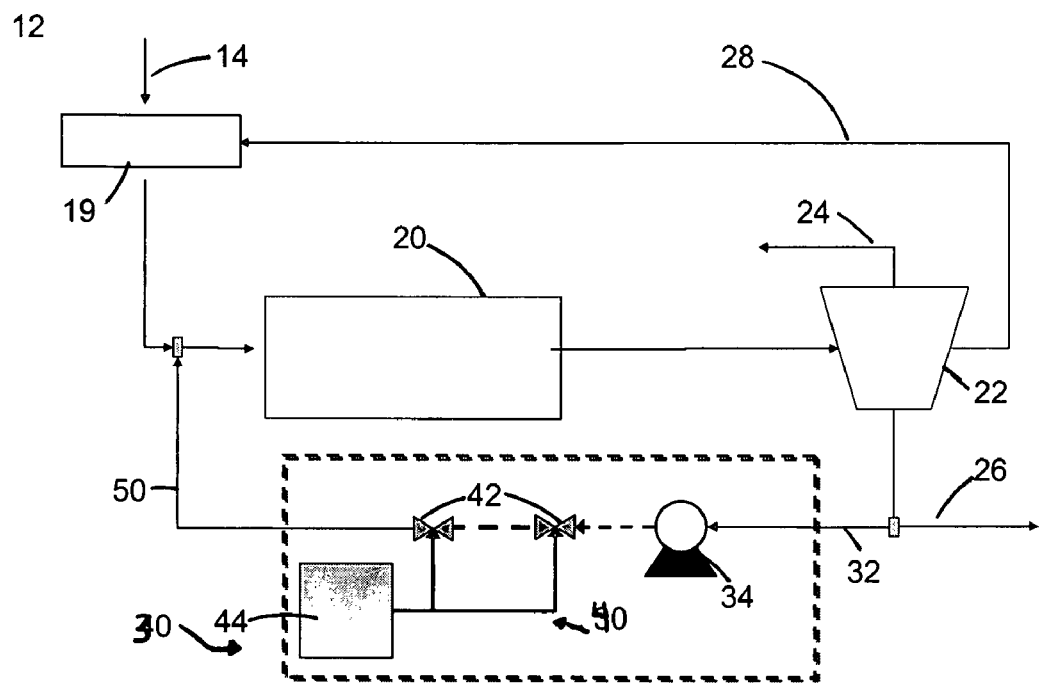
FIG. 9 is still another embodiment of the present system wherein the treated stream is an alternate RAS stream.

FIG. 9 depicts yet another alternate embodiment where the treated liquid stream is not diverted from the main RAS (28) but rather is an independent parallel stream that is referred to as an alternate RAS (32). This embodiment is useful in wastewater treatment plants that feed the main RAS (28) from the clarifier (22) to an anoxic basin (19) rather than directly to the activated sludge basin (20). Because wastewater treatment plants are increasingly required to achieve certain de-nitrification requirements, the main RAS stream (28) is often routed to or through an anoxic basin (19). In some operations, the anoxic basin (19) is simply an oxygen free section at or near the head of the main aeration basin (20). In other wastewater plant operations, the anoxic basin (19) is a separate tank or basin from the main activated sludge basin (20). In either situation, the present sludge ozonation system process would defeat the purpose of de-nitrification in an anoxic basin. Therefore, a separate RAS line (32), referred to as the alternate RAS line is incorporates the plug flow reactor (30), the ozone injection system (40) and is coupled directly to the aerated portion of the activated sludge basin (20). Flow in the main RAS line (28) is generally larger than the flow in the alternate RAS line (32). The descriptions and connections of the other components in the treatment system (12) including items such as the clarifier (22), WAS line (26), the ozone injectors (42), ozone generator (44), pump (34), influent line (14), and effluent line (24) are similar to those described with reference to above-described embodiments and will not be repeated here.

The efficient and cost effective ozonation of sludge in the above-described embodiments requires the presence of three process conditions (i) the use of the ozone predominately for the lysis or breaching of the cells i.e., achieving a high selectivity for the lysis reaction; (ii) limiting exposure of the totally or partially lysed cells to additional ozone within the reactor, as this could lead to the complete release of the cellular contents in the reactor and the subsequent costly chemical oxidation of the released substrates by the additional ozone, rather than by the much cheaper option of bio-oxidation of the released substrates by the bacterial cells in the activated sludge basin; and (iii) the realization of a very narrow range of residence time distributions for the bacterial cells within the reactor.

By the use of a plug flow reaction approach, all of these desirable process conditions can be realized within the reactor or contactor. The plug flow reaction approach is attained specifically by designing for the sludge-ozone flow to occur with minimal back-mixing, and for the contacting to occur mostly within a mostly tubular configuration. Specifically, the illustrated embodiments have a prescribed or controlled residence time and the achievement of high selectivity of the lysis reaction. In the above-described embodiments, a plug-flow reaction is used to achieve a high selectivity of the lysis reaction by providing for a narrow range of contact time between cells and dissolved ozone (i.e. narrow residence time distribution), so that ozone is used only for the reactions leading to cell lysis ("primary reactions"), and so that ozonation does not continue so as to further oxidize the cell contents ("secondary reactions") nor to oxidize the products of the secondary reactions ("tertiary reactions"). This provides for the most efficient use of ozone, leading to maximum sludge reduction at the minimum ozone dosage.

As described with respect to the illustrated embodiments, one or a multiplicity of gas injection points are employed to match the rate of ozone supplied for dissolution to the rate of reaction of biosolids with the dissolved ozone along the prescribed length of the plug flow reactor. This avoids over or under supply of ozone, promoting efficient use of ozone for cell lysis while avoiding use of ozone for oxidation of cell contents.

As indicated above, chemical agents or gases other than ozone could be applied in the high selectivity reactor either directly to the RAS or to a sidestream of activated sludge. Other chemical agents such as chlorine, pH adjusting-agents, biocides, odor control agents, or even other gas mixtures such as carbon dioxide, nitrogen, oxygen, ozone, and mixtures thereof, could be suitable to carry out the desired treatment process to the sludge flow in the high selectivity treatment reactor.

Foam and Bulking Control

As indicated above, foaming and bulking problems in wastewater treatment operations are generally caused by the presence of an abundance of filamentous bacteria such as Nocardia and Parvicella in the wastewater. The present sludge ozonation process in a high selectivity reactor can be tailored to reduce filamentous bacteria populations which, in turn, lead to a reduction or elimination in foam in the activated sludge basin and a reduction in bulking.

Figure 10:
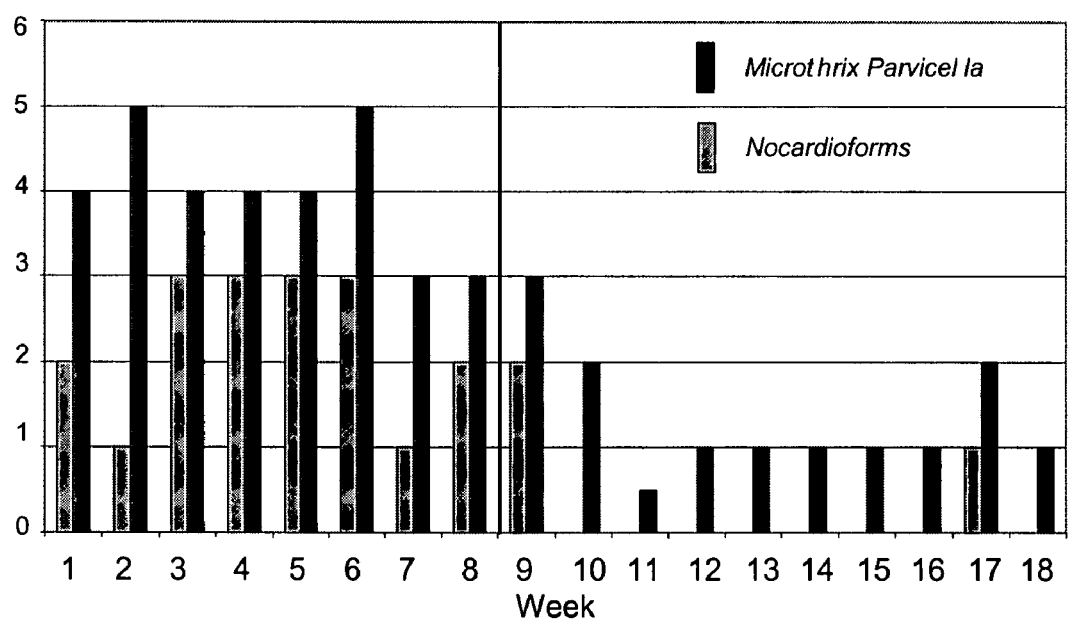
FIG. 10 is a graph that depicts the presence of selected filamentous bacteria in an activated sludge treatment basin in the weeks prior to ozonation and the weeks during ozonation in accordance with the present invention.

As shown in FIG. 10, the presence of filamentous bacteria, namely the Nocardia and Parvicella bacteria strains, were monitored for several weeks prior to ozonation treatment described above. Within several weeks, the Nocardia bacteria were substantially eliminated while the Microthrix Parvicella bacteria were significantly reduced. The large surface areas of the filamentous bacteria translates to a high vulnerability to reaction with ozone with little or no adverse impact on other biomass organisms such as ciliates, heterotrophs, etc. Such reduction in Nocardia, Parvicella, and other filamentous bacteria and the corresponding reduction in foaming and bulking were clearly noticeable in the first few weeks of ozonation treatment in the high selectivity reactor.

For purposes of controlling foaming and bulking, the introduction of ozone into a diverted stream within the high selectivity reactor is preferably a tightly controlled process. In particular, the ozone used during such ozonation process is preferably maintained within the range of about 0.04 to about 5.0 g of ozone per day per kg of sludge in the activated sludge basin, and more preferably the range of about 0.1 to about 1.5 g of ozone per day per kg of sludge in the activated sludge basin. By using such optimized, small dosages of ozone, the present method ensures that the ozone reaction within the high selectivity reactor is concentrated on the filamentous organisms with minimal impact on other microbial populations. Excessive dosages of ozone will affect the non-filamentous organisms in addition to the filamentous organisms. Conversely, where the purpose of ozonation is to maximize sludge reduction, the ozone dosage is preferably within the range of about 0.04 g to about 20.0 g of ozone per day per kg of sludge in the basin or wastewater treatment reactor, and more preferably in the range of about 1.0 g to about 10.0 g of ozone per day per kg of sludge to ensure the ozonation of both filamentous organisms and non-filamentous organisms, and still more preferably, in the range of about 2.0 g to about 6.0 g of ozone per day per kg of sludge.

The present system and method of ozonation also operates to dissolve any oxygen gas that accompanies the ozone into the sludge that is returned to the activated sludge treatment basin. As previously indicated, filamentous organisms tend to thrive in wastewater having low levels of dissolved oxygen as such large surface area organisms have an inherent advantage over other bacteria cells to get the limited oxygen within the wastewater. Thus, in addition to filamentous bacteria control via the process of lysis of the cells, the present ozonation system facilitates the improvement in the overall oxic conditions of the sludge, which minimizes filamentous organism proliferation vis-à-vis other bacteria due to low levels of dissolved oxygen in the sludge.

In utilizing the presently disclosed embodiments of the present sludge treatment process, it is desirable to control selected parameters, either through design of the system or in operation of the system. Preferably, the rate of ozone supplied for dissolution is correlated to the rate of reaction of biosolids or the filamentous organisms with the dissolved ozone along the length of the plug flow reactor. This correlation of the ozone supply with the rate of biosolids or filamentous organisms' reaction within the plug flow reactor avoids over-supply or under-supply of ozone and thereby promotes the efficient use of ozone for cell lysis while avoiding the use of ozone gas for the secondary reactions.

The plug flow reactor with ozone injection is designed and operated in a manner such that a single pass of sludge through the plug flow reactor achieves: (i) a nearly complete and substantially uniform lysis of the excess bacterial cells or (ii) filamentous bacteria cells or (iii) a combination thereof. Preferably, by varying the volume of sludge that is diverted and processed through the plug flow reactor, closely managing the residence time distribution, or varying the ozone dosage, it is possible to control the amount of sludge as well as the amount of foam that is reduced. Alternatively, the high selectivity reactor can be designed and operated in a manner where several passes through the reactor are required to achieve the desired sludge and/or foam removal.

Typical values for the Food-to-Microorganism (F/M) ratio, i.e., the ratio of the grams of substrate material entering into the activated sludge basin on a daily basis compared to the quantity in grams of bacterial cells in the activated sludge basin, range from about 0.04 to 2.0 grams substrate material per day/gram of bacterial cells, depending on the type of the activated sludge process that is utilized. Likewise, the yield of newly synthesized bacterial cells following the bacterial consumption of substrate material is about 0.2 to 0.6 kg of biosolids per kg of substrate material consumed. Thus, using the present process for ozonation and thus reduction of sludge, one would model or empirically determine the amount of sludge to be diverted to the plug flow reactor, the residency time, and the amount of ozone to be injected into the reactor that is necessary to reduce between about 0.2 to 0.6 kg of sludge times the average mass (in kg) of new substrate material introduced into the activated sludge basin per day. From an economic standpoint, one can calculate the cost savings of eliminating the solids handling associated with the volume of biosolids against the cost of the ozone consumed in the process.

The above-identified methods and systems for the treatment of sludge using ozone can be utilized alone or in conjunction with other sludge reduction techniques. Moreover, each of the specific steps involved in the preferred process, described herein, and each of the components in the preferred systems are easily modified or tailored to meet the peculiar design and operational requirements of the particular activated sludge treatment system in which it is used and the anticipated operating environment for given activated sludge treatment process.

For example, the source gas used in conjunction with the ozone generation system could comprise air, air enriched with oxygen, pure oxygen gas, or nearly pure oxygen gas. However, because the core activated sludge treatment process also has a basic oxygen requirement, the use of nearly pure or pure oxygen gas as a source gas is preferred. In addition, the use of pure or nearly pure oxygen source gas and the injection of the ozone-enriched gas in or near the plug flow reactor could be controlled in a manner such that all or a substantial fraction of the overall oxygen requirement for biological treatment in the activated sludge process in the activated sludge basin is provided by the sludge ozonation system.

From the foregoing, it should be appreciated that the present invention thus provides a method for the treatment of sludge using ozone-enriched gas as well as a method of foam or bulking control in wastewater treatment operations. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. A method of treating wastewater in a wastewater treatment plant comprising the steps of:
   receiving an influent of wastewater into a wastewater treatment basin or reactor;
   oxidizing biosolids within the wastewater treatment basin or reactor;
   discharging a stream from the wastewater treatment basin or reactor;
   diverting a portion of the stream discharged from the wastewater treatment reactor to a plug-flow type reactor;
   introducing ozone to the plug-flow type reactor inducing lysis of biosolids within the plug-flow type reactor with the ozone; and
   returning the diverted stream to the wastewater treatment basin or reactor;
   wherein the ozone is introduced to the diverted stream in the range of about 1.0 to 10.0 g of ozone per day per kg of sludge in the wastewater treatment basin or reactor and wherein the contact time of the ozone with the diverted stream in the plug flow reactor ranges between about 10 to 60 seconds.

2. A method of treating wastewater in a wastewater treatment plant comprising the steps of:
   receiving an influent of wastewater into a wastewater treatment basin or reactor;
   oxidizing biosolids within the wastewater treatment basin or reactor;
   discharging a stream from the wastewater treatment basin or reactor;
   diverting a portion of the stream discharged from the wastewater treatment reactor to a plug-flow type reactor;
   introducing ozone to the plug-flow type reactor inducing lysis of filamentous bacteria within the plug-flow type reactor with the ozone; and
   returning the diverted stream to the wastewater treatment basin or reactor;
   wherein the ozone is introduced to the diverted stream in the range of about 0.1 to about 1.5 g of ozone per day per kg of sludge in the wastewater treatment basin or reactor for purposes of foam reduction and wherein the contact time of the ozone with the diverted stream in the plug flow reactor ranges between about 10 to 60 seconds.

3. A method of reducing foaming or bulking of wastewater in an activated sludge basin, the method comprising the steps of:
oxidizing biosolids within the activated sludge basin;
discharging an activated sludge stream from the activated sludge basin;
diverting a portion of the activated sludge stream discharged from the activated sludge basin to a plug-flow type ozone treatment reactor;
introducing ozone to the diverted stream in the plug-flow type ozone treatment reactor in an amount sufficient to induce lysis of filamentous bacteria; and
returning the ozonated stream to the activated sludge basin wherein the ozone is introduced to the diverted stream in the range of about 0.1 to about 1.5 g of ozone per day per kg of sludge in the wastewater treatment reactor.

* * * * *